United States Patent [19]

Cichy

[11] 4,349,381

[45] Sep. 14, 1982

[54] RECOVERY OF HEAVY METALS FROM SPENT ALUMINA

[75] Inventor: Paul Cichy, Buffalo, N.Y.

[73] Assignee: Kennecott Corporation, Stamford, Conn.

[21] Appl. No.: 192,390

[22] Filed: Sep. 30, 1980

[51] Int. Cl.$^3$ .............................................. C22B 4/00
[52] U.S. Cl. ..................................... 75/10 R; 75/24; 75/65 R; 75/68 R
[58] Field of Search ............ 75/10 R, 63, 65 R, 68 R, 75/24

[56] References Cited

U.S. PATENT DOCUMENTS 3,694,190 9/1972 Langston .......................... 75/65 R Primary Examiner—P. D. Rosenberg
Attorney, Agent, or Firm—Paul A. Leipold

[57] ABSTRACT

The invention provides a method wherein alumina-containing slag from melting of spent alumina catalyst material is transported to a second furnace for finishing to satisfactory temperature, composition and quantity for casting as an abrasive material or cast refractory. In one embodiment of the invention, the molten alumina slag material is cast into an inclined trough for direct delivery from the spent catalyst furnace to the abrasive or refractory furnace for finishing.

7 Claims, 2 Drawing Figures

DIRECT MELT TRANSFER METHOD BY MEANS OF A TROUGH

MELT TRANSFER LADLE METHOD

DIRECT MELT TRANSFER METHOD BY MEANS OF A TROUGH

RECOVERY OF HEAVY METALS FROM SPENT ALUMINA

TECHNICAL FIELD

This invention relates to the recovery of heavy metals such as nickel and cobalt from spent catalyst materials, particularly those containing alumina.

BACKGROUND ART

The present invention relates to a process for recovering a heavy metal catalyst component from a waste catalyst. Generally in chemical industries, especially in the petrochemical industry, petroleum refining industry and the soap and detergent industry, a great amount of heavy metal catalysts such as Ni, Co, Mo, V, Cu and the like are used. Such catalysts are used, for example, in the production of various synthetic polymers, desulfurization of petroleum, hydrogeneration of oils and/or fats, etc. Most of these catalysts are employed in a form of so-called supported catalysts wherein the heavy metal is deposited on the surface of the support or carrier composed of a porous, noncombustible inorganic material such as $Al_2O_3$, $SiO_2$, MgO, CaO, $ZrO_2$ and the like. Recently, the amount of these catalysts consumed has been rapidly increasing with the remarkable growth of the above said industries. Therefore, there exists a need to develop an economical process for completely recovering the heavy metal catalytic component from the waste catalyst. Since the waste catalysts are continually spent in great quantities, they represent a potential cause of environmental pollution. In one prior art process, the heavy metal from the spent catalyst is utilized as a component in the production alloys, wherein the waste catalyst containing an analytically determined amount of the heavy metal is added to a metal previously melted in an electric furnace. However, since the amount of the waste catalyst which can be added is limited as compared with that of the metal of the original melt, this method is not suitable for continuously treating a great amount of waste catalyst. Further, this method has the disadvantage of lowering the efficiency of the alloy production process by producing an enormous volume of slag.

In another prior art process, a nickel containing waste catalyst used in the hydrogenation of oils and/or fats is agitated in an organic solvent such as acetone to separate oils and/or fats. Nickel and kieselguhr, enabling reuse of these components. However, since it is difficult in this process to separate each component completely, large scale treatment is not attainable and the cost is prohibitedly expensive. This method also has the disadvantage of requiring an immense expense for preventing secondary environmental pollution caused by the waste water generated in the process.

U.S. Pat. No. 3,577,217 discloses another prior art process wherein a spent catalyst represented by the formula $CuO \cdot CuCr_2O_4$ is heated in admixture with a carbonate or hydroxide of an alkali metal in the presence of oxygen and then the resulting reaction mixture is mixed with water to recover cupric oxide as an insoluble solid and a chromic acid salt of the alkali metal in the aqueous solution. However, it is difficult in the above process to separate and recover the support, and therefore, it is inapplicable to the recovery of the heavy metals from spent supported catalysts.

U.S. Pat. No. 4,029,495 to Hirayama discloses a process for recovery of heavy metals from spent catalyst materials. The Hirayama process comprises introducing the spent supported catalyst in the form of a powder into a rotary, rocking or gradient furnace, heating the spent catalyst in the furnace to a temperature of at least a 1000° C. to transform it into a sintered or seim-melted state, agitating the sintered or semi-melted mass to cause the metallic particles to aggregate as discrete masses and further cause the sintered mass to break up or granulate and separating the metallic catalytic component from the other components. Hirayama also contemplates use of the catalytic carrier support material in a process for formation of ceramic fibers of alumina and silicate. This method suffers from the disadvantages that the adjustment of composition of the alumina carrier material prior to formation into the fibers is difficult without contaminating the heavy metal being recovered and further the process is one embodiment uses a great deal of energy which is lost by cooling of the material for separation of the metallic component from the other components.

U.S. Pat. No. 4,142,871 to Zeiringer discloses a process for recovery of heavy metals from spent catalytic material. The Zeiringer process comprises the steps of melting the catalytic starting material with a reducing agent to obtain a melt consisting of a melt component including the alumina on an alloy residue, cooling the melt at a speed collated with the desired crystalite size of the abrasive material to be obtained and mechanically separating the melt component from the alloy residue before or after solidification. The melt component is used as an abrasive material. This process has the disadvantage that the adjustment of the abrasive material composition is difficult in the presence of the heavy metal which is to be recovered. Further, the process wherein the material is cooled prior to separation makes difficult the recycling of materials.

Therefore, there remains a need for an improved method of efficiently separating heavy metal materials from spent catalyst materials.

DISCLOSURE OF THE INVENTION

It is an object of this invention to overcome difficulties of prior methods of recovering heavy metals from spent catalytic material.

It is a further object of this invention to provide a low-cost method of recovering heavy metals from alumina catalysts.

It is another further object of this invention to efficiently utilize the heat required in recovery of alumina catalysts.

It is another object of this invention to provide alumina for use in forming refractories and abrasive materials.

It is a further object of this invention to provide recovered heavy metals in an easily usable form.

These and other objects of the invention are generally accomplished by providing a method wherein alumina-containing slag from melting of spent alumina catalyst material is transported to a second furnace for finishing to satisfactory temperature, composition and quantity for casting as an abrasive material or cast refractory.

In a particularly preferred form of the invention, the molten alumina slag material is cast into an inclined trough for direct delivery from the spent catalyst furnace to the abrasive or refractory furnace for finishing.

BEST MODE OF CARRYING OUT THE INVENTION

The system of the invention has numerous advantages over prior methods of recovering heavy metals. The system allows utilization of both the heavy metals and the alumina material which may be used as abrasive or cast refractory material. Another advantage of the instant system is that the system conserves the energy used in producing the molten alumina and metal for further low-cost refining of the alumina into useful articles.

Figure 1:
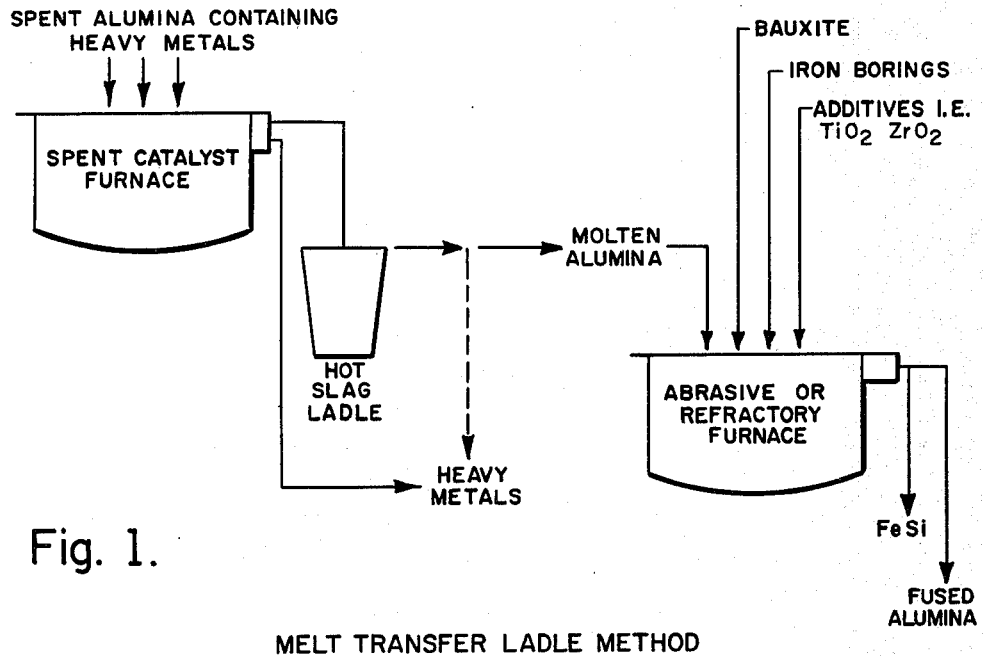
FIG. 1 is an illustration in flow sheet form of a process in accordance with the invention in which molten alumina is transferred from the spent alumina furnace to an abrasive or refractory forming furnace by means of a ladle.

The system as exemplified by FIG. 1 utilizes the spent catalyst furnace to melt the spent alumina-containing heavy metals. The molten alumina is poured from the spent alumina furnace into a hot slag ladle, transferred to the abrasive or refractory furnace and put into the abrasive or refractory furnace while molten. Then further, bauxite or other composition adjusting materials are added in the abrasive or refractory furnace and then molten alumina product is poured from the furnace for molding in complete form as a fused cast refractory or into molds which cool at a desired rate to form a particular size crystal for abrasive use. The heavy metals may be poured into the hot slag ladle for transfer to molds for cooling or as is preferred, the heavy metals may be cast directly from the spent catalyst furnace into molds. It is preferred to cast directly in order that the hot slag ladle not be contaminated by the heavy metals which would then be transferred to the abrasive or refractory furnace. It is also possible if spent catalyst materials of low heavy metal concentration are being processed that the dumping of the molten alumina may be performed a multiplicity of times prior to pouring into a mold of heavy metals which will build up in the bottom of the spent catalyst furnace as successive charges are melted. The process as exemplified by FIG. 2 may be expected to result in an energy savings of about 80% of the energy required to produce molten alumina from spent alumina-containing catalysts.

Figure 2:
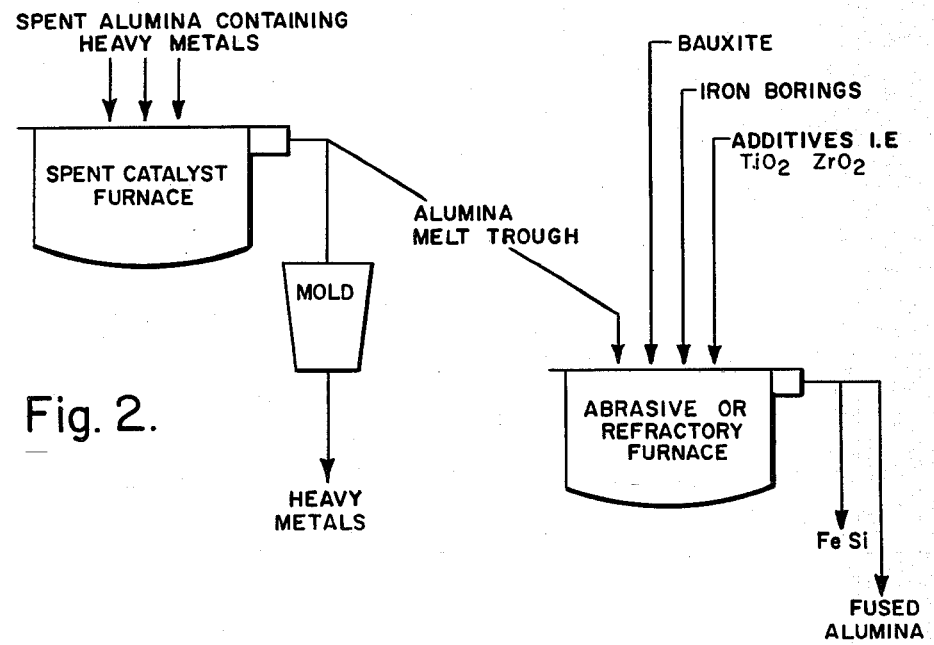
FIG. 2 is an illustration in flow sheet form of a semi-continuous spent catalyst recovery system wherein the alumina melt is dumped in a trough from the spent catalyst furnace into the abrasive or refractory furnace and the heavy metals are periodically poured into a mold for cooling and recovery.

As illustrated in FIG. 2, a semi-continuous transfer of the molten alumina from the spent catalyst furnace is carried out. The spent catalyst furnace is charged with spent alumina-containing heavy metals. The spent alumina, containing the heavy metals, is heated by the electric furnace to produce the molten alumina at up to about 2100° C. When the batch is molten, it is poured into a trough which leads directly to the abrasive or refractory furnace. The spent catalyst furnace is then deep poured to remove the bottom portion where the heavy metals collect. The pouring of the heavy metals may be conducted periodically if the heavy metal concentration is not so high that it may be economically molded with each pour of the alumina. By this method, the recovery of energy utilized in producing the molten catalyst alumina may be over 95%. This process is preferred because of the energy savings, but may require greater capital expense because of the requirement for an upper spent catalyst furnace which may dump by trough into a lower abrasive or refractory furnace. The transfer ladle of the second method would generally require less capital expense.

The furnaces used for both the spent catalyst furnace and the abrasive or refractory furnace typically are three-phase three electrode arc furnaces. It is also possible to use three-phase multi-electrode or two electrode single-phase electric arc furnaces. The furnaces may be the pour or tapping type furnaces for semi-continuous operation. The pouring type is perferred for ease of control of the taps. However, the tapping type could be utilized with tap holes at different locations to tap the alumina material separate from the heavy metals. A typical furnace would have about an 11 foot (3.3 meter) shell diameter, about 7 foot (2.1 meter) depth and about a three inch (7.6 cm) lining of graphite within its steel shell. The furnaces are generally water cooled by a ring which is around the upper edge and pours water over the outside from a series of spaced holes. Water spray cooling of the bottom is also commonly carried out. These furnaces form a shell of alumina or other material being melted therein on the inner side of the graphite. The material which builds up on the inner surface generally called a skull serves to protect the bottom and sides from leaks of the very high temperature molten material to the steel shell. The instant process is suitable for recovering any heavy metal which has a specific gravity when molten of greater than that of molten alumina. The heavy metal catalysts generally include nickel, cobalt, molybdenum, copper and vanadium or mixtures thereof. A preferred material for recovery by this method is nickel as it is a commonly available heavy metal utilized with high alumina carrier material and has a specific gravity much greater than molten alumina such that it easily separates.

The spent alumina containing catalytic material utilized in the instant process may be any material which precipitates a heavy metal when heated in an electrode arc furnace and which contains a significant amount of alumina. The preferred materials are catalysts consisting largely of alumina and the heavy metals as these materials allow ease of formation into the alumina abrasives or refractory materials which are desirable materials. However, the system of the invention also could be practiced with catalysts of less pure composition, particularly when the molten alumina containing material is added as a smaller percentage into the abrasive or refractory furnace. By adding only a small percentage of recovered impure catalytic alumina material, any impurities in the alumina would be minimized by inclusion in the larger batch.

Any type of spent alumina containing catalysts containing heavy metals may be utilized in the instant invention. Typical sources of spent catalysts are those from the petrochemical industry, petroleum refining industries and the soap and detergent industry.

Any temperature which is sufficient to provide a molten alumina slag and molten metal is suitable for utilization in the spent catalyst furnace. Typically, the temperature of the alumina would be above about 1800° C. The preferred temperatures for the abrasive or refractory furnaces are between about 2000° and 2200° C. in order to volatilize impurities and obtain molten alumina with the additives such as zirconium or titanium oxides that are necessary for abrasive production.

If the spent catalytic material contains significant amounts of organic impurities, then the spent catalytic material should be roasted or calcined prior to being charged to the electric furnace previously identified as the spent catalyst furnace. If the feed material contains greater than 10% water it is also necessary to roast or calcine the spent catalytic material. As the feed materials for an electrode arc furnace are best in certain size ranges, the spent catalyst material must necessarily be brought within these ranges if it is not already suitable. The preferred feed for an electrode arc furnace is about 80% to 90% of the feed between about 60 mesh (U.S. Sieve Series) and about 1 inch (2.5 cm). There should be between about 10 and about 20% small material of between about 4 and about 60 mesh (U.S. Sieve Series). If significant silica is present, additives may be necessary to increase the conductivity of the melt in the furnace. Among such additives are alumina.

The heavy metal is recovered in a generally pure form, although there may be some alloying metals and silicon present. The instant process is very satisfactory in that impurities are not contributed by the process and generally the metal recovered may be readily utilized in the conventional processes for preparing commercial nickel, cobalt or other heavy metal. The system of the invention finds advantage in utilizing a second abrasive or refractory electrode arc furnace as the spent alumina material from the spent catalyst or other sources generally is not of the precise composition best for abrasive or refractory manufacture. The chemical composition of high performance alumina abrasives and for fused cast refractories is very critical to their performance. For instance, impurities in cast refractories which are utilized in the glass industry can easily contaminate glass in the furnaces. Further, very small amounts of impurities in alumina abrasives can seriously deteriorate the structural integrity of the abrasive grain leading to early failure of grinding wheels or coated abrasives formed from these abrasive grains. By utilizing in the invention of a second abrasive or refractory furnace, the adjustment of composition to accurate desired state is possible. Further, the longer heat times of the abrasive or refractory necessary for impurity removal also may be carried out economically while short cycles may be utilized for the spent catalyst furnace. In addition, it would not be satisfactory to add bauxite, iron borings or other metallic additives to the spent catalyst material resting on the heavy metal as it would be likely alloyed with the metal and not be controllably added to the abrasive material. This would lead to less value of the recovered heavy metal and a difficult or impossible to control composition of the spent alumina on the heavy metal.

The trough utilized in the semi-continous process of FIG. 3 may be formed of any material which does not add impurities to the alumina, is capable of withstanding periodic use with materials up to about 2100° C. and is not extremely high in cost. Typical of such materials are alumina-containing refractory cements and alumina refractories. The preferred material is graphite able to withstand the extreme temperatures and intermittent use without contributing to undesirable impurities. Further, rather than a trough, a pipe or direct pouring could be utilized.

The transfer ladle would generally be of steel construction lined with graphite. However, transfer ladle constructions may be utilized such as alumina refractory lining in the steel shell.

While particular embodiments of methods for recovery of heavy metals from alumina refractories have been set forth, it will be obvious that changes and modifications can be made without departing from the spirit of the invention. For instance, while the spent alumina source has been set forth as a catalyst, there are other sources of spent alumina such as fused cast refractory materials available upon rebuild of furnaces and materials from dust collecting processes which may be available for processing in the spent alumina recovery process of the invention. The appended claims are intended to include recovery of heavy metals from spent alumina sources other than catalysts. In another variation of the invention, the heavy metal could be poured into a trough for delivery to molds rather than being poured directly into molds. These and other modifications may be made without departing from the spirit and scope of the invention as set forth in the appended claims.

What is claimed is:

1. A method of recovery of heavy metal and alumina from spent alumina comprising melting spent alumina comprising alumina and heavy metal in a first electrode arc furnace, separating molten alumina by pouring from the upper portion of the melt into a transport means, passing said molten alumina from said transport means into a second electrode arc furnace, adjusting the composition of said molten alumina in said second arc furnace such that the refined alumina is suitable for abrasives or refractories, withdrawing refined alumina from said second furnace to form refractory or abrasive materials by casting from said second furnace and withdrawing heavy metal remaining in said first furnace after removal of said molten alumina.

2. The method of claim 1 wherein said transport means comprises a ladle.

3. The method of claim 1 wherein said transport means is a trough.

4. The method of claim 1 wherein heavy metal in said first furnace is poured to form ingots.

5. The method of claim 1 wherein said spent alumina comprises spent catalyst materials.

6. The method of claim 1 wherein said melting in said first electrode arc furnace is at a temperature greater than 1800° C. for the molten alumina.

7. The method of claim 1 wherein said heavy metal consists essentially of nickel, cobalt, molybdenum, copper, vanadium or mixtures thereof.

* * * * *